Sept. 30, 1958 H. B. VINCENT 2,853,834
FORMING GLASS ARTICLES
Filed Jan. 11, 1954 2 Sheets-Sheet 2
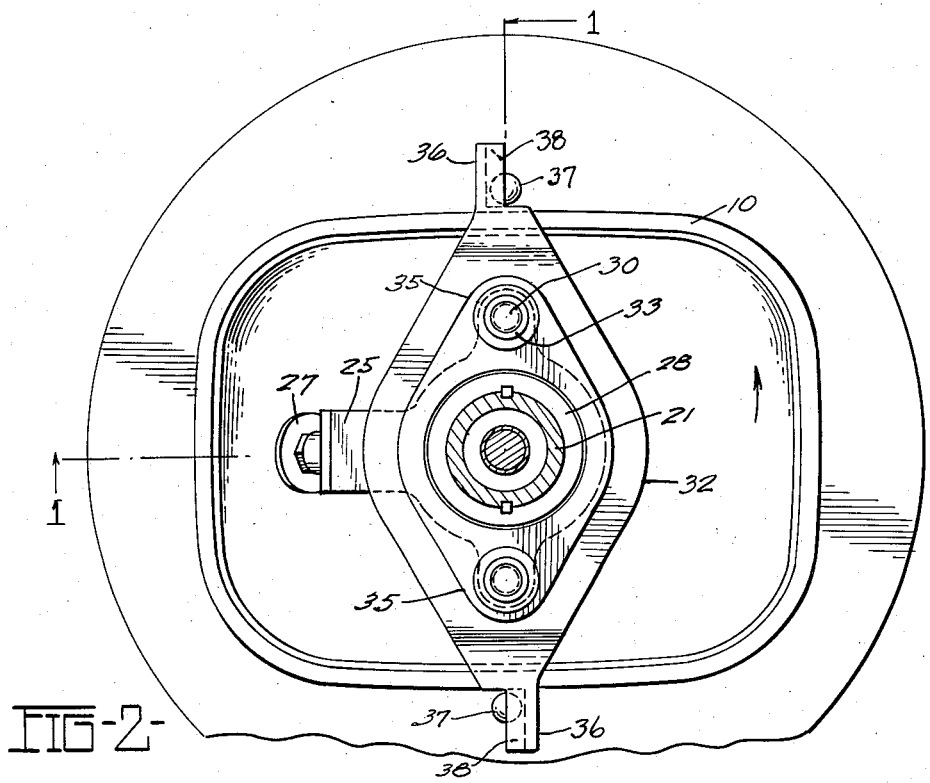
FIG-2-
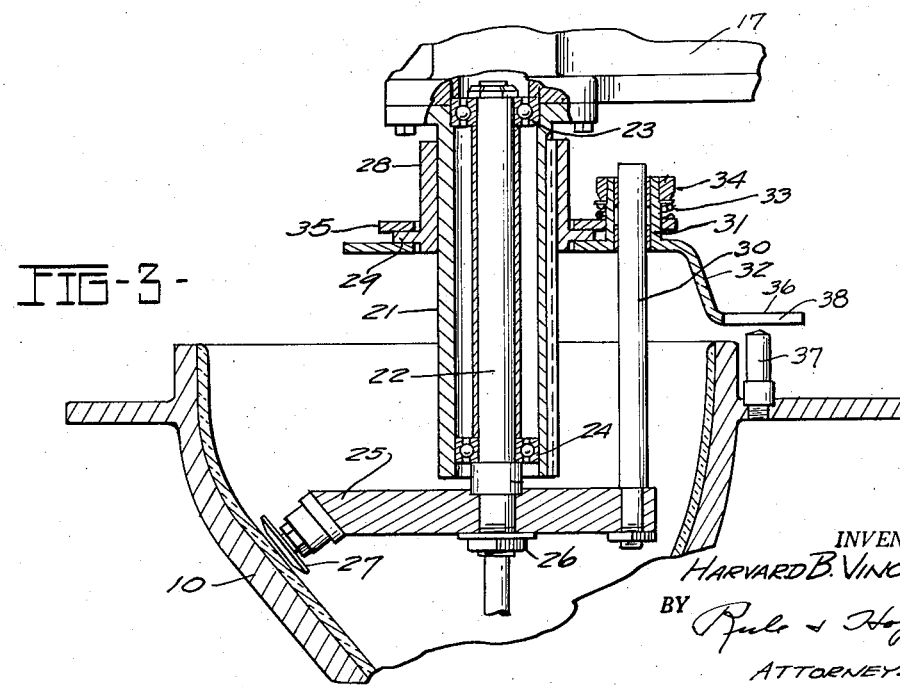
FIG-3-
INVENTOR.
HARVARD B. VINCENT
BY
ATTORNEYS

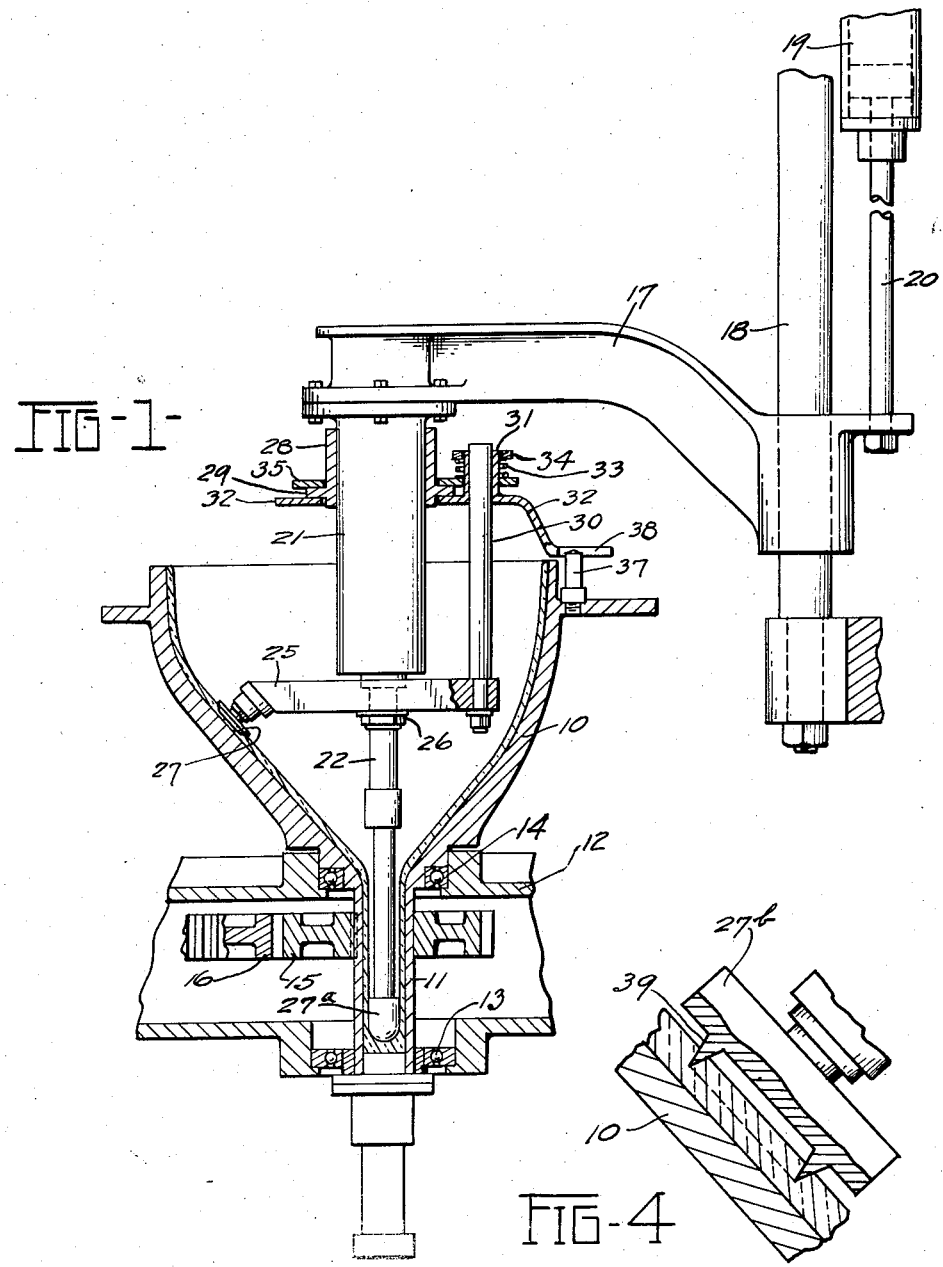

2,853,834

FORMING GLASS ARTICLES

Harvard B. Vincent, Toledo, Ohio, assignor to Owens-Illinois Glass Company, a corporation of Ohio Application January 11, 1954, Serial No. 403,211

5 Claims. (Cl. 49—29)

This invention relates to the forming of hollow glass articles and more particularly to the forming of such articles as cathode ray tubes by centrifugal casting. As presently manufactured, cathode ray tubes are made by separately fabricating a glass face plate and a hollow glass funnel and subsequently sealing the parts together. The funnel may be formed by centrifugal casting, wherein a charge of glass is deposited in the apex of a hollow mold and the mold is rotated about its axis to form the hollow funnel. After the hollow funnel has been formed, and before the face plate is sealed thereto, one wall of the funnel is pierced and a metallic anode button is inserted in the opening in the wall by an appropriate glass to metal seal.

It is an object of this invention to provide a method and apparatus for providing an opening in the wall of the hollow funnel during the centrifugal forming, thereby eliminating the step of forming the opening after the hollow funnel is fabricated.

Other objects of the invention will appear hereinafter.

Basically, the invention comprises bringing a tool into contact with the glass along one wall of the hollow mold during the rotation of the mold, and interlocking the movement of the tool and the mold to prevent relative movement, thereby causing the tool to press against one area of the glass wall and displace the glass from that area, and continuing the rotation permitting the displaced glass to become redistributed due to the centrifugal action.

Referring to the accompanying drawings:

Fig. 1 is a fragmentary sectional view at the line 1—1 on Fig. 2;

Fig. 2 is a sectional plan view of the apparatus;

Fig. 3 is a fragmentary sectional elevational view on an enlarged scale; and

Fig. 4 is a fragmentary sectional view of a modified form of a portion of the apparatus.

As shown in Fig. 1 a hollow open-ended mold 10 with an integral neck portion 11 is mounted for rotation about its vertical axis on table 12 by means of bearings 13 and 14. The mold is rotated by a gear 15 keyed to the neck 11 and a drive gear 16 meshing with the gear 15.

A tool support 17 is mounted for vertical reciprocating movement into and out of the hollow mold. The tool holder reciprocates on shaft 18 by the action of piston motor 19 connected to the tool holder through shaft 20.

A hollow cylindrical projection 21 is fastened to the tool holder 17 and a shaft 22 is journaled in the projection 21 by means of bearings 23, 24. A tool holder 25 is mounted on the shaft 22 and held in position thereon by a lock nut 26. A glass pressing tool 27 is mounted on one side of the tool holder 25. As shown in Fig. 3, the tool 27 is frusto-conical in configuration, whereby when the flat surface thereof is pressed against the glass, the glass will be forced away from the mold forming an opening in the wall of the glass.

A second tool 27ª may be mounted on the shaft 22 in order to press and form the glass in the neck portion of the mold, as shown in Fig. 1. The operation and construction of the latter mechanism is not a part of this invention.

The apparatus includes means for interlocking the mold and tool holder 25 in order that they may move in unison without any relative movement. This means includes a sleeve 28 keyed to the cylindrical projection 21, and having a peripheral flange 29. The tool holder 25 is provided with a pair of aligning shafts 30 projecting upwardly into tubular projections 31 on alignment collar 32. The alignment collar 32 is held in contact with the lower surface of the flange 29 by means of two springs 33 and lock nuts 34 threaded on tubular projections 31 and pressing a plate 35 against the upper surface of the flange 29.

The alignment collar is provided with ears 36 extending outwardly and contacting pins 37 on the mold 10. As the tool support moves downwardly, the ears 36 come in contact with the pins 37 on the rotating mold and the pins cause rotation of the alignment collar, and in turn of the tool holder 25 through the shafts 30. As shown in Fig. 3, the ears 36 are provided with inclined surfaces 38 in the direction of travel to permit overriding in cases of misalignment or an obstruction to the rotation. If the ears 36 are not engaged squarely by the pins 37 when the tool support is being moved downwardly, then the alignment collar will not be rotated. The mold will continue to rotate and the pins 37 on the mold will subsequently squarely engage the ears 36 and cause the alignment collar to rotate with the mold and, in turn, rotate the tool holder 25. For example, if a portion of the ears 36 contacts the top of pins 37 as the tool holder is moved downwardly, there will be no positive engagement between pins 37 and ears 36 so that the mold will continue to rotate without rotating the tool holder.

The operation of the apparatus may be briefly summarized as follows:

At the beginning of the cycle the tool support is in its uppermost position and a charge of glass is deposited in the apex of the funnel. The funnel is then rotated about its axis in order to distribute the glass along the sides of the mold by centrifugal action. As the rotation of the mold is continued, the tool support is moved downwardly, and the pins 37 on the mold contact the ears 36 causing the alignment collar and in turn the tool holder 25 and tool 27 to move in unison with the mold. Continued movement of the tool support downwardly causes the tool 27 to press an area of the glass along one wall of the mold and displace the glass from that area, leaving an opening or hole in the wall of the glass. The glass, which is displaced, is redistributed by the centrifugal action.

A modified form of the invention is shown in Fig. 4 wherein the tool 27ᵇ is provided with a circular scoring surface 39 causing a circular groove in the glass. By using this type of a tool the wall of the glass funnel is formed with a continuous or circular groove and upon cooling of the funnel, the circular disk of glass is removed by the formation of differential thermal stresses.

Modifications of the invention may be resorted to within the spirit and scope of the appended claims.

I claim:

1. An apparatus for forming hollow glass articles which comprises an open ended hollow mold having an inner molding surface conforming in shape and size to the exterior surface of the article to be molded and to which a charge of glass may be fed by gravity, means for rotating the mold about its axis for forming a charge of glass by centrifugal action, a tool mounted for rotation about the axis of the mold, means for bringing said tool into and out of relative position with a side wall of the mold in order to apply a force to the glass along said side wall, means for interlocking said tool and mold during rotation of said mold and after the tool has been brought into position, thereby preventing relative motion between said tool and mold during the time when the tool is brought into contact with the glass, said means for bringing the tool into and out of contact comprising a projection concentric with the axis of the mold and mounted for vertical movement relative to the mold, means for mounting said tool for relative rotation with respect to said projection, means for moving said projection along the axis of said mold, said means for interlocking the tool and mold comprising an aligning collar mounted on said projection and interconnected with said tool, pins projecting from the edge of said mold, said aligning collar being formed with projecting ears adapted to contact said pins when the projection is moved to bring the tool downwardly within the mold and thereby cause the pins to press against the ears and rotate the aligning collar and in turn the tool in unison with the mold.

2. An apparatus for forming hollow glass articles which comprises an open ended hollow mold having an inner molding surface conforming in shape and size to the exterior surface of the article to be molded and to which a charge of glass may be fed by gravity, means for rotating the mold about its axis for forming a charge of glass by centrifugal action, a tool mounted for rotation about the axis of the mold, means for bringing said tool into and out of relative position with a side wall of the mold in order to apply a force to the glass along said side wall, means for interlocking said tool and mold during rotation of said mold and after the tool has been brought into position and thereby preventing relative motion between said tool and mold during the time when the tool is brought into contact with the glass, said tool comprising a surface for pressing and piercing the glass by displacement from the point of contact.

3. The apparatus set forth in claim 2, said means for bringing the tool into and out of contact comprising a projection concentric with the axis of the mold and mounted for vertical movement relative to the mold, means for mounting said tool for relative rotation with respect to said projection, and means for moving said projection along the axis of said mold.

4. The apparatus set forth in claim 3, said means for interlocking the tool and mold comprising an aligning collar mounted on said projection and interconnected with said tool, pins projecting from the edge of said mold, said aligning collar being formed with projecting ears adapted to contact said pins when the projection is moved to bring the tool downwardly within the mold and thereby cause the pins to press against the ears and rotate the aligning collar and in turn the tool in unison with the mold.

5. The method of forming hollow glass articles which comprises placing a charge of glass in the apex of a hollow funnel having an inner molding surface conforming in shape and size to the exterior surface of the article to be molded, rotating the mold about its axis to distribute the glass along the sides of the mold by centrifugal action, applying pressure to a single area of glass along one wall surface of the mold, said area being isolated circumferentially and axially from the remainder of the glass along said one wall surface and spaced from the axis of the mold, continuing the application of said pressure to said single isolated area of glass until the glass displaced from said area by said pressure is redistributed by centrifugal action and the entire resultantly shaped charge of glass loses sufficient heat to be self-sustaining.

References Cited in the file of this patent

UNITED STATES PATENTS

| | | |
|---|---|---|
| 224,245 | Taylor et al. | Feb. 3, 1880 |
| 1,859,957 | Canfield | May 24, 1932 |
| 2,172,798 | Littmann | Sept. 12, 1939 |
| 2,296,347 | Hinkley et al. | Sept. 22, 1942 |
| 2,374,269 | Breadner et al. | Apr. 24, 1945 |
| 2,485,769 | Phelps | Oct. 25, 1949 |
| 2,662,346 | Giffen | Dec. 15, 1953 |
| 2,696,699 | Giffen | Dec. 14, 1954 |

FOREIGN PATENTS

| | | |
|---|---|---|
| 540,229 | Great Britain | Oct. 9, 1941 |